(12) United States Patent
Sanchez-Carrera et al.

(10) Patent No.: US 9,728,803 B2
(45) Date of Patent: Aug. 8, 2017

(54) REDOX FLOW BATTERY SYSTEM INCLUDING AN ANODE ELECTRODE HAVING A SUBSURFACE ALLOY

(71) Applicant: Robert Bosch GmbH, Stuttgart (DE)

(72) Inventors: Roel Sanchez-Carrera, Cambridge, MA (US); Boris Kozinsky, Waban, MA (US); Paul Albertus, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 648 days.

(21) Appl. No.: 14/184,765

(22) Filed: Feb. 20, 2014

(65) Prior Publication Data

US 2014/0234684 A1    Aug. 21, 2014

Related U.S. Application Data

(60) Provisional application No. 61/767,587, filed on Feb. 21, 2013.

(51) Int. Cl.
| | |
|---|---|
| *H01M 8/18* | (2006.01) |
| *H01M 4/90* | (2006.01) |
| *H01M 4/92* | (2006.01) |
| *H01M 8/12* | (2016.01) |
| *H01M 8/20* | (2006.01) |

(52) U.S. Cl.
CPC ......... *H01M 8/188* (2013.01); *H01M 4/9091* (2013.01); *H01M 4/92* (2013.01); *H01M 4/921* (2013.01); *H01M 8/12* (2013.01); *H01M 8/20* (2013.01); *Y02E 60/528* (2013.01)

(58) Field of Classification Search
CPC ........... H01M 8/12; H01M 8/188; H01M 4/92
See application file for complete search history.

(56) References Cited

U.S. PATENT DOCUMENTS

| | | | | |
|---|---|---|---|---|
| 5,635,039 A | * | 6/1997 | Cisar ..................... | B01D 53/22 204/252 |
| 6,183,623 B1 | * | 2/2001 | Cisar ..................... | B01D 53/22 204/252 |
| 2007/0117000 A1 | * | 5/2007 | An ........................ | H01M 4/926 429/483 |

OTHER PUBLICATIONS

Bae et al., "Size Effects on Monolayer Catalysis—Model Study: Pt Submonolayers on Au(111)," Electrocatalysis, vol. 3, Issue 3-4, pp. 203-210, published online Feb. 2012.
Greeley et al., "Near Surface Alloys for Hydrogen Fuel Cell Applications," Catalysis Today, 2006, pp. 52-58.
Knudsen et al., "A Cu/Pt Near-Surface Alloy for Water-Gas Shift Catalysis", Journal of the American Chemical Society, 2007, pp. 6485-6490.

(Continued)

*Primary Examiner* — Jason M Berman
(74) *Attorney, Agent, or Firm* — Maginot Moore & Beck LLP

(57) ABSTRACT

A hydrogen/bromine reduction-oxidation flow battery system includes a bromine electrode, a hydrogen electrode, a membrane, a first catalyst, and a second catalyst. The membrane is positioned between the bromine electrode and the hydrogen electrode. The first catalyst is associated with the bromine electrode. The second catalyst is associated with the hydrogen electrode and at least partially formed from a subsurface alloy configured (i) to promote facile dissociation of $H_2$, and (ii) to prevent bromide from adsorbing onto the hydrogen electrode.

16 Claims, 3 Drawing Sheets

(56) References Cited

OTHER PUBLICATIONS

Stephens et al., "Controlling the Reactivity of Pt(111) by Alloying at the Submonolayer Scale", abstract, available on or before Feb. 20, 2013.
International Search Report and Written Opinion corresponding to PCT Application No. PCT/US2014/017322, mailed Jul. 7, 2014 (9 pages).
Kosek, J. A. et al., "Advanced Hydrogen Electrode for a Hydrogen-Bromine Battery", Journal of Power Sources, vol. 22, No. 3-4, Mar. 1, 1988, pp. 293-300 (8 pages).

\* cited by examiner of U.S. 9,728,803 B2

REDOX FLOW BATTERY SYSTEM INCLUDING AN ANODE ELECTRODE HAVING A SUBSURFACE ALLOY

This application claims the benefit of priority of U.S. provisional application Ser. No. 61/767,587, filed Feb. 21, 2013, the disclosure which is herein incorporated by reference in its entirety.

FIELD

This disclosure relates generally to battery systems and more particularly to an anode electrode of an $H_2/Br_2$ reduction-oxidation ("redox") flow battery system that is at least partially formed from a subsurface alloy of Cu/Pt(111) and/or Au/Pt(111).

BACKGROUND

A redox flow battery ("RFB") system is a form of rechargeable battery/fuel cell in which an electrolyte containing one or more dissolved electroactive species flows through an electrochemical cell that converts chemical energy to electricity. The electrolyte is stored externally, generally in tanks, and is circulated through the cell (or cells) of the battery system. Control of flow batteries requires knowledge of a flow rate and a State of Charge ("SOC") of the cell. Together these two factors determine the concentration and availability of reactants at the electrodes, and the current that can be drawn from the cell for the best efficiency within predetermined operating limits. The SOC is also used to determine how much energy the battery is capable of storing or delivering. The identified SOC may also determine the power that the battery is capable of producing at any given time during the discharge process.

One particular type of redox flow battery system is referred to as an $H_2/Br_2$ battery system. This type of battery system provides high-quality electricity under safe and economic conditions. Other characteristics of $H_2/Br_2$ battery systems include a high-intrinsic reversibility of the electrode reactions, high-power capabilities, and extended cycle life. As a result of the above-described benefits and characteristics, $H_2/Br_2$ battery systems show potential as a viable battery system for grid-scale energy storage.

One concern of $H_2/Br_2$ battery systems is that halide species present in the battery system could "poison" electrocatalytic surfaces of the electrode(s) (typically the anode electrode), thereby compromising the cell life. Despite collected evidence for the poisoning effect of halides on various catalytic surfaces in other types of battery systems, a systematic study that has determined the effects of halide poisoning in the $H_2/Br_2$ battery system is unavailable. It is likely that evidence of the poisoning effects is unavailable due to the complexity of measuring the adsorption of bromine species on platinum-like metals. Accordingly, the concern of electrocatalytic surface poisoning in $H_2/Br_2$ battery systems is a potential limitation that should be addressed.

In light of the foregoing limitations in the art, a need exists for an improved $H_2/Br_2$ battery system that is less susceptible to poisoning of the anode electrode.

SUMMARY

According to one embodiment of the disclosure, a hydrogen/bromine reduction-oxidation flow battery system includes a bromine electrode, a hydrogen electrode, a membrane, a first catalyst, and a second catalyst. The membrane is positioned between the bromine electrode and the hydrogen electrode. The first catalyst is associated with the bromine electrode. The second catalyst is associated with the hydrogen electrode and is at least partially formed from a subsurface alloy configured (i) to promote facile dissociation of $H_2$, and (ii) to prevent bromide from adsorbing onto the hydrogen electrode.

According to another embodiment of the disclosure, a reduction-oxidation flow battery system includes a cathode electrode, an anode electrode, a cation-exchange membrane, a first catalyst, and a second catalyst. The cation-exchange membrane is positioned between the cathode electrode and the anode electrode. The first catalyst is associated with the cathode electrode. The second catalyst is associated with the anode electrode and is at least partially formed from a subsurface alloy including a solute metal and a host metal. The solute metal is one of copper and gold, and the host metal is Pt(111).

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
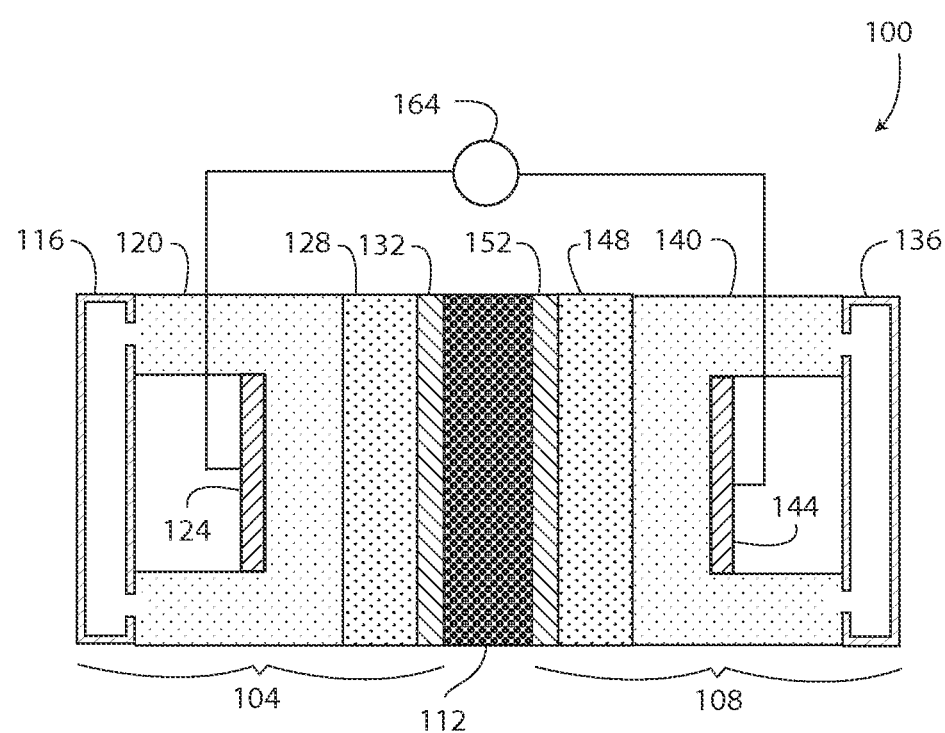
FIG. 1 is a cross sectional view showing an $H_2/Br_2$ battery system, as described herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

As shown in FIG. 1, a hydrogen/bromine reduction-oxidation flow battery system 100 includes a bromine portion 104, a hydrogen portion 108, and a membrane 112 positioned between the bromine portion and the hydrogen portion. The bromine portion 104 includes a bromine source 116, a bromine flow field 120, a current collector 124, a bromine electrode 128, and a catalyst 132. The bromine source 116 includes an aqueous solution of bromine ("$Br_2$") in hydrogen bromide ("HBr") (referred to herein as "HBr/$Br_2$" aqueous solution or "$Br_2$/HBr" aqueous solution), which is typically a liquid at room temperature and pressure. The bromine source 116 is formed from (or lined with) any material that is typically used to store HBr/$Br_2$, such as glass, lead, Teflon® or any other sufficiently corrosion resistant material as desired by those of ordinary skill in the art.

The bromine flow field 120 is fluidly connected to the bromine source 116 and is configured to receive the HBr/$Br_2$ stored by the bromine source. The bromine flow field 120 is formed from a carbon-based material and is electronically conductive. As a result, the bromine flow field 120 is corrosion resistant, durable, and low cost. The bromine flow field 120 is porous and is configured to enable the HBr/Br$_2$ solution to flow therethrough.

The current collector 124 is connected to the bromine flow field 120. The current collector 124 is configured to form a positive terminal (i.e. a cathode) of the battery system 100 during a discharge condition of the battery system. The current collector 124 is positioned such that at least a portion of the current collector contacts the HBr/Br$_2$ solution flowing through the bromine flow field 120. The current collector 124 is electronically conductive and is at least partially formed from metal, such as aluminum or another suitable metal, as desired by those of ordinary skill in the art.

The bromine electrode 128 (also referred to herein as a cathode electrode) is fluidly coupled to the bromine source 116 through the bromine flow field 120. The bromine electrode 128 is at least partially formed from a porous carbon substrate to enable the HBr/Br$_2$ solution to flow therethrough. Accordingly, the bromine electrode 128 is configured to be supplied with the HBr/Br$_2$ solution from the bromine source 116.

The catalyst 132 is associated with the bromine electrode 128. In an exemplary embodiment, the catalyst 132 is deposited on and throughout the bromine electrode 128. Accordingly, the catalyst 132 is configured to contact the HBr/Br$_2$, as the HBr/Br$_2$ flows through the bromine electrode 128. The catalyst 132 is at least partially formed from one or more of platinum, tantalum, and iridium.

The hydrogen portion 108 includes a hydrogen source 136, a hydrogen flow field 140, a current collector 144, a hydrogen electrode 148, and a catalyst 152. The hydrogen source 136 is configured to store hydrogen in the gas phase. The hydrogen source 136 is formed from (or lined with) any material that is typically used to store gaseous hydrogen (i.e. gaseous H$_2$), such as glass or metal.

The hydrogen flow field 140 is fluidly connected to the hydrogen source 136 and is configured to receive the hydrogen stored by the hydrogen source. The hydrogen flow field 140 is formed from a carbon-based material and is electronically conductive. As a result, the hydrogen flow field 140 is corrosion resistant, durable, and low cost. The hydrogen flow field 140 is porous and is configured to enable the gaseous hydrogen to flow therethrough.

The current collector 144 is connected to the hydrogen flow field 140. The current collector 144 is configured to form a negative terminal (i.e. an anode) of the battery system 100 during a discharge operation of the battery system. At least a portion of the current collector 144 is positioned to the contact the hydrogen flowing through the hydrogen flow field 140. The current collector 144 is electronically conductive and is at least partially formed from metal, such as copper or any other suitable metal, as desired by those of ordinary skill in the art.

The hydrogen electrode 148 (also referred to herein as an anode electrode) is fluidly coupled to the hydrogen source 136 through the hydrogen flow field 140. The hydrogen electrode 148 is at least partially formed from a porous carbon substrate to enable the gaseous hydrogen to flow therethrough. Accordingly, the hydrogen electrode 148 is configured to be supplied with gaseous hydrogen (H$_2$) from the hydrogen source 136.

The catalyst 152 is associated with the hydrogen electrode 148. In an exemplary embodiment, the catalyst 152 is deposited on and throughout the hydrogen electrode 148. Accordingly, the catalyst 152 is configured to contact the gaseous hydrogen as the gaseous hydrogen flows through the hydrogen electrode 148.

Figure 2:
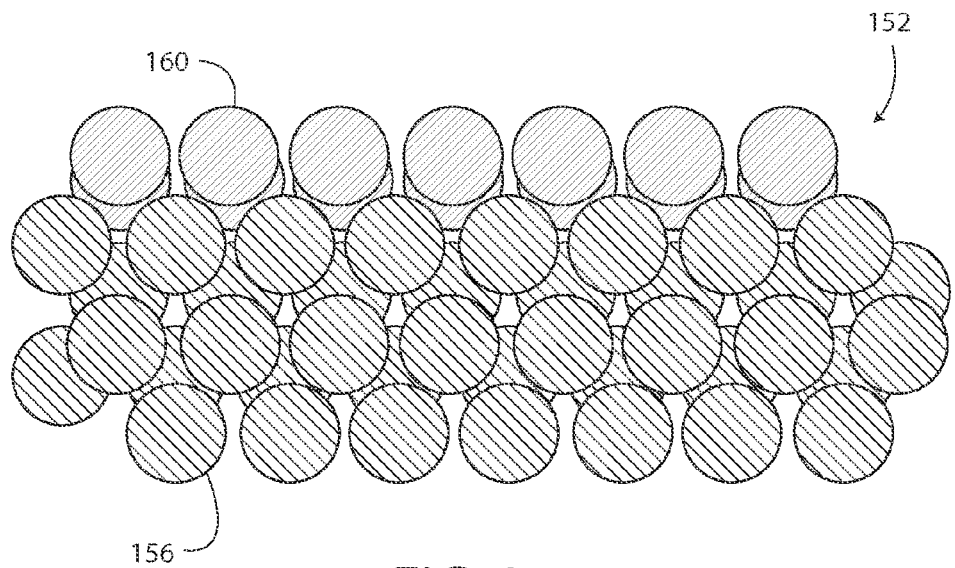
FIG. 2 is an atomic model of a subsurface alloy of a catalyst of the $H_2/Br_2$ battery system of FIG. 1.
Figure 3:
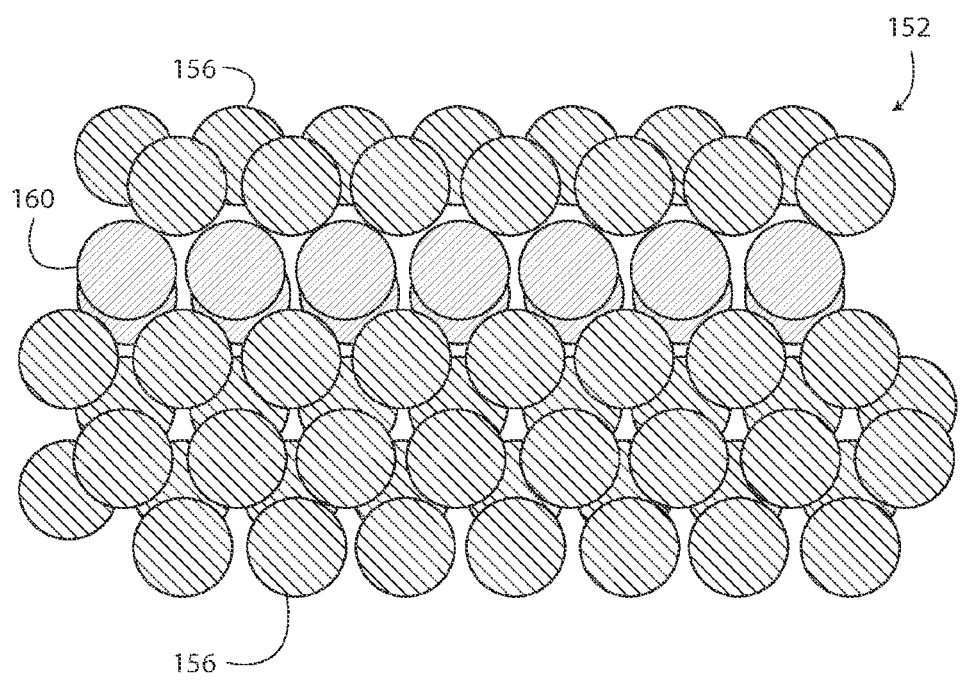
FIG. 3 is an atomic model of another subsurface alloy of a catalyst of the $H_2/Br_2$ battery system of FIG. 1.

With reference to FIGS. 2 and 3, the catalyst 152 is at least partially formed from a subsurface alloy including a host metal 156 and a solute metal 160. The host metal 156, in one exemplary embodiment, is at least partially formed from Pt(111). Pt(111) is a crystalline form of platinum (Pt), which defines a crystallographic plane represented by the Miller indices (111), as known to those of ordinary skill in the art. In other embodiments, the host metal 156 is formed from any other suitable metal (in any crystallographic orientation), as desired by those of ordinary skill in the art. The solute metal 160 is formed from gold (Au) or copper (Cu); however, in another embodiment, the solute metal is formed from any metal as desired by those of ordinary skill in the art. Accordingly, in the exemplary embodiment described herein, the subsurface alloy of the catalyst 152 includes at least one of Cu/Pt(111) and Au/Pt(111).

The subsurface alloy (also referred to herein as a near surface alloy) includes alloys in which the solute metal 160 is present at or near the surface of the host metal 156. In particular, as shown in the exemplary configuration of FIG. 2, an atomically thin layer of the solute metal 160 is positioned at the surface of the host metal 156. As shown in the exemplary configuration of FIG. 3, an atomically thin layer of the solute metal 160 is positioned near the surface of the host metal 156 below an atomically thin layer of the host metal. In other embodiments, the subsurface alloy of the catalyst 152 includes other configurations of subsurface alloys, as desired by those of ordinary skill in the art.

In the typical subsurface alloy, only a minute amount of solute metal 160 is included in the host metal 156. For example, in an exemplary subsurface alloy, the solute metal 160 comprises approximately 0.1% to 5% of the material of the subsurface alloy (by weight or volume). Even though the solute metal 160 is present in only a very small quantity of the catalyst 152, the solute metal has a dramatic effect on the catalytic properties of the host metal 156, as described in detail below.

The membrane 112 is positioned between the bromine portion 104 and the hydrogen portion 108 and is connected to the catalyst 132 and the catalyst 152. The membrane 112 is a cation-exchange membrane that is configured to enable the passage of ions therethrough, but prevents the passage of anions and electrons therethrough. The membrane 112 is at least partially formed from sulfonated polystyrene. In one particular embodiment, the membrane 112 is formed from Nafion® or any other desired material or polymer. The membrane 112 is very effective at preventing the passage of anions; however, some anions typically "leak" through the membrane.

In operation, the battery system 100 converts chemical energy into electrical energy. During a discharge operation of the battery system 100, gaseous hydrogen stored in the hydrogen source 136 is circulated through the hydrogen flow field 140 and the hydrogen electrode 148, and HBr/Br$_2$ is circulated through the bromine source 116. As the hydrogen moves through the electrode 148, the hydrogen is oxidized at the surface of the catalyst 152. The oxidation of the hydrogen produces hydronium ions and electrons according to the following half-cell reaction equation (1).

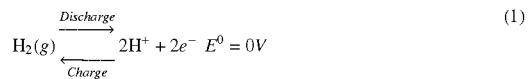

Next, during the discharge operation the hydronium ions migrate through the membrane 112 to the bromine electrode 128. The electrons generated in equation (1) travel through the hydrogen flow field 140 and the current collector 144 to an electrical load 164 connected to the battery system 100.

After being received by the electrical load, the electrons continue to the current collector 124 of the bromine portion 104. The electrons then move through the bromine flow field 120 and the electrode 128 to the catalyst 132. Upon reaching the catalyst 132, the electrons reduce the bromine of the HBr/Br$_2$ to produce bromide and to generate a theoretical electric potential of 1.098 V at 25° C., according to the following equation (2).

$$Br_2(aq) + 2e^- \underset{Charge}{\overset{Discharge}{\rightleftarrows}} 2Br^-(aq) \quad E^0 = 1.098\ V \quad (2)$$

The bromide ions combine with the hydronium ions transported through the membrane 112 to produce hydrobromic acid. Accordingly during discharge, the hydrogen and bromine form hydrobromic acid and electrons as shown in the below equation (3), which describes the net overall reaction of the battery system 100.

$$H_2(g) + Br_2(aq) \underset{Charge}{\overset{Discharge}{\rightleftarrows}} 2HBr \quad E^0 = 1.098\ V \quad (3)$$

During a charging operation of the battery system 100 the above equations and reactions (1), (2), and (3) operate from right to left to convert the hydrobromic acid to hydrogen and bromine. Accordingly, during the charging operation the HBr/Br$_2$ solution becomes enriched in Br$_2$ and depleted in HBr, whereas during discharge the HBr/Br$_2$ solution because enriched in HBr and depleted in Br$_2$. The above reaction equation (3) shows that the battery system 100 has a high intrinsic reversibility of the electrode reactions.

In the typical H$_2$/Br$_2$ flow battery system, the catalyst associated with the hydrogen electrode (i.e. the anode) is subject to Br-species poisoning as a result of the catalyst adsorbing anions, such as bromides and other bromine species, transported through the membrane. The battery system 100 is resistant to the above-described poisoning due to the composition of the catalyst 152.

The composition of the catalyst 152 was selected based on, among other factors, the binding energy for bromine (Br) on the metal or metal alloy of the catalyst 152. Using a systematic density functional theory ("DFT") based investigation approach, the binding energy of Br for materials including Au(111), Pt(111), Cu/Pt(111), and Au/Pt(111) was determined. As shown in Table 1, the materials are arranged from the least to the greatest binding energy. With regard to the battery system 100, a low binding energy is desirable, since a material with a low binding energy prevents bromine from adsorbing onto the catalyst 152 to a greater extent than a material with a high binding energy. Therefore, by reducing the potential for bromine to bind to the catalyst 152, the useful lifespan of the catalyst 152 is increased.

TABLE 1

| Metal or metal alloy | Binding Energy for Br (eV) |
|---|---|
| Cu/Pt(111) | −1.76 |
| Au(111) | −1.78 |
| Au/Pt(111) | −1.88 |
| Pt(111) | −2.10 |

From the results shown in Table 1 each of the materials exhibited a lower binding energy for Br than did Pt(111).

Figure 4:
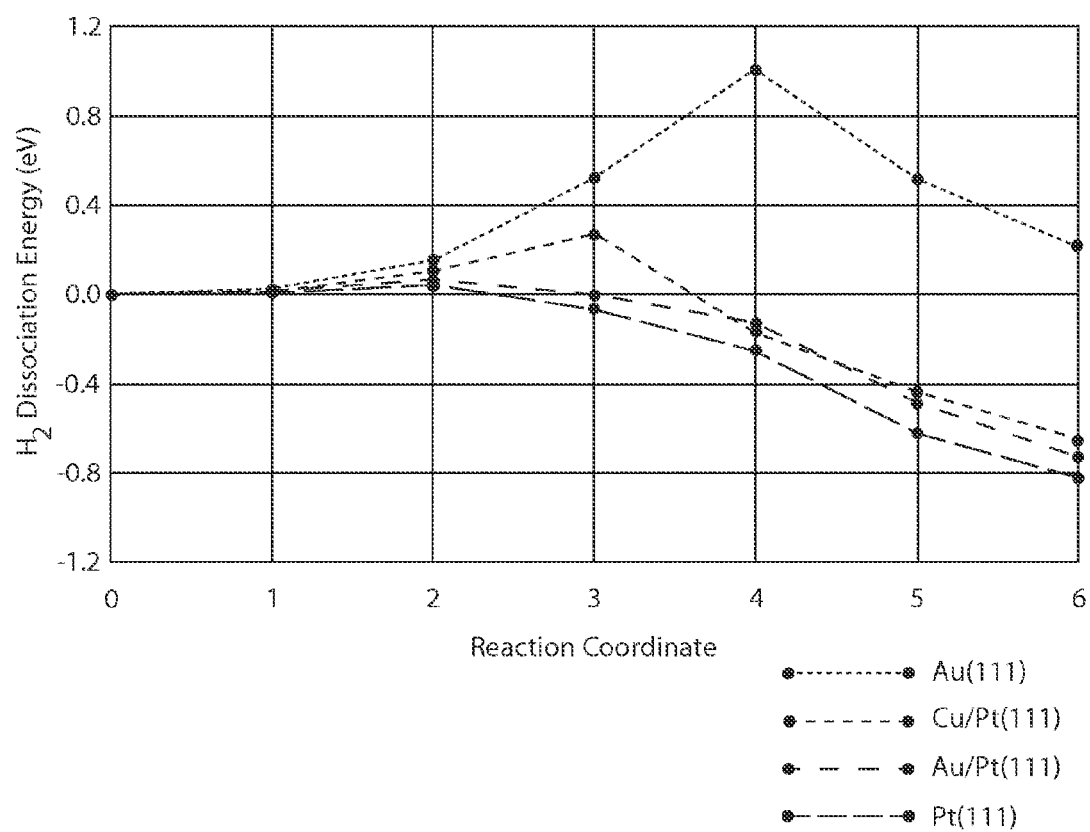
FIG. 4 is a graph showing a reaction pathway for $H_2$ dissociation reaction on various types of metallic surfaces.

In addition to exhibiting a low binding energy for Br, it is important that the catalyst 152 sustains facile H$_2$ dissociation. Dissociation refers to gaseous H$_2$ dissociating into atomic hydrogen (H) over the catalyst 152. As shown in FIG. 4, to test the H$_2$ dissociation kinetics of the metals/metal alloys of Table 1, climbing image-nudged elastic band ("CI-NEB") calculations were performed to connect the adsorbed molecular state of the H$_2$ molecule with the dissociated state of the H$_2$ molecule. The results indicate that the subsurface alloys of Cu/Pt(111) and Au/Pt(111) both exhibit a reaction pathway that is similar to the reaction pathway of Pt(111), thereby making these subsurface alloys viable materials forming the catalyst 152, since both materials promote facile H$_2$ dissociation.

Based on the results shown in Table 1 and FIG. 4, the subsurface alloys Cu/Pt(111) and Au/Pt(111) are suitable materials for forming the catalyst 152 since these materials (i) offer a lower binding energy for Br than Pt(111) and (ii) sustain facile H$_2$ dissociation at a rate similar to Pt(111). A catalyst 152 at least partially formed from the subsurface alloys Cu/Pt(111) and Au/Pt(111), is less subject to Br-species poisoning. As a result, the battery system 100, has an increased lifespan as compared to the typical H$_2$/Br$_2$ battery system that includes a hydrogen catalyst formed from Pt(111) without a subsurface alloy.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A hydrogen/bromine reduction-oxidation flow battery system comprising:
    a bromine electrode;
    a hydrogen electrode;
    a membrane positioned between the bromine electrode and the hydrogen electrode;
    a first catalyst associated with the bromine electrode; and
    a second catalyst associated with the hydrogen electrode and at least partially formed from a subsurface alloy configured (i) to promote facile dissociation of H$_2$, and (ii) to prevent bromide from adsorbing onto the hydrogen electrode,
    wherein the subsurface alloy includes a solute metal and a host metal, and
    wherein the subsurface alloy includes an atomically thin layer of the solute metal positioned at the surface of the host metal.

2. The hydrogen/bromine reduction-oxidation flow battery system of claim 1, wherein:
    the solute metal is copper, and
    the host metal is Pt(111).

3. The hydrogen/bromine reduction-oxidation flow battery system of claim 1, wherein:

the solute metal is gold, and
the host metal is Pt(111).

4. The hydrogen/bromine reduction-oxidation flow battery system of claim 1, further comprising:
a first source fluidly coupled to the hydrogen electrode and configured to supply the hydrogen electrode with gaseous $H_2$; and
a second source fluidly coupled to the bromine electrode and configured to supply the bromine electrode with a $Br_2$/HBr aqueous solution.

5. The hydrogen/bromine reduction-oxidation flow battery system of claim 1, wherein:
the bromine electrode is at least partially formed from a first porous carbon substrate and the first catalyst is deposited on the first porous carbon substrate, and
the hydrogen electrode is at least partially formed from a second porous carbon substrate and the second catalyst is deposited on the second carbon substrate.

6. The hydrogen/bromine reduction-oxidation flow battery system of claim 1, wherein the first catalyst is at least partially formed from one or more of platinum, tantalum, and iridium.

7. The hydrogen/bromine reduction-oxidation flow battery system of claim 1, wherein the membrane is a cation-exchange membrane.

8. The hydrogen/bromine reduction-oxidation flow battery system of claim 7, wherein the membrane includes a sulfonated polystyrene membrane.

9. A reduction-oxidation flow battery system comprising:
a cathode electrode;
an anode electrode;
a membrane positioned between the cathode electrode and the anode electrode;
a first catalyst associated with the cathode electrode; and
a second catalyst associated with the anode electrode and at least partially formed from a subsurface alloy including a solute metal and a host metal,
wherein the solute metal is one of copper and gold,
wherein the host metal is Pt(111), and
wherein the subsurface alloy includes an atomically thin layer of the solute metal positioned at the surface of the host metal.

10. The reduction-oxidation flow battery system of claim 9, wherein the second catalyst is configured (i) to promote facile dissociation of $H_2$, and (ii) to prevent bromide from adsorbing onto the anode electrode.

11. The reduction-oxidation flow battery system of claim 9, further comprising:
a first source fluidly coupled to the anode electrode and configured to supply the anode electrode with gaseous $H_2$; and
a second source fluidly coupled to the cathode electrode and configured to supply the cathode electrode with a $Br_2$/HBr aqueous solution.

12. The reduction-oxidation flow battery system of claim 9, wherein:
the cathode electrode is at least partially formed from a first porous carbon substrate and the first catalyst is deposited on the first porous carbon substrate, and
the anode electrode is at least partially formed from a second porous carbon substrate and the second catalyst is deposited on the second carbon substrate.

13. The reduction-oxidation flow battery system of claim 9, wherein the first catalyst is at least partially formed from one or more of platinum, tantalum, and iridium.

14. The reduction-oxidation flow battery system of claim 9, wherein the membrane is a cation-exchange membrane.

15. The reduction-oxidation flow battery system of claim 14, wherein the membrane includes a sulfonated polystyrene membrane.

16. A hydrogen/bromine reduction-oxidation flow battery system, comprising:
a bromine electrode;
a hydrogen electrode;
a membrane positioned between the bromine electrode and the hydrogen electrode;
a first catalyst associated with the bromine electrode; and
a second catalyst associated with the hydrogen electrode and at least partially formed from a subsurface alloy configured (i) to promote facile dissociation of $H_2$, and (ii) to prevent bromide from adsorbing onto the hydrogen electrode,
wherein the subsurface alloy includes a solute metal and a host metal, and
wherein the subsurface alloy includes an atomically thin layer of the solute metal positioned between the surface of the host metal and an atomically thin layer of the host metal.

* * * * *